United States Patent
Kim et al.

(10) Patent No.: US 12,451,562 B2
(45) Date of Patent: Oct. 21, 2025

(54) SEPARATOR FOR ELECTROCHEMICAL DEVICE AND ELECTROCHEMICAL DEVICE INCLUDING THE SAME

(71) Applicant: LG ENERGY SOLUTION, LTD., Seoul (KR)

(72) Inventors: Min-Ji Kim, Daejeon (KR); So-Mi Jeong, Daejeon (KR); Da-Kyung Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 493 days.

(21) Appl. No.: 18/017,914

(22) PCT Filed: Aug. 30, 2021

(86) PCT No.: PCT/KR2021/011628
§ 371 (c)(1),
(2) Date: Jan. 25, 2023

(87) PCT Pub. No.: WO2022/045858
PCT Pub. Date: Mar. 3, 2022

(65) Prior Publication Data
US 2023/0282939 A1    Sep. 7, 2023

(30) Foreign Application Priority Data
Aug. 28, 2020 (KR) .................. 10-2020-0109686

(51) Int. Cl.
| | |
|---|---|
| *H01M 50/451* | (2021.01) |
| *H01M 4/62* | (2006.01) |
| *H01M 10/0525* | (2010.01) |
| *H01M 50/403* | (2021.01) |

(52) U.S. Cl.
CPC ......... *H01M 50/451* (2021.01); *H01M 4/623* (2013.01); *H01M 10/0525* (2013.01); *H01M 50/403* (2021.01)

(58) Field of Classification Search
CPC .................................................. H01M 10/0525
See application file for complete search history.

(56) References Cited

U.S. PATENT DOCUMENTS

| | | |
|---|---|---|
| 5,736,610 A | 4/1998 | Nishi et al. |
| 2011/0225940 A1 | 9/2011 | Romdhane et al. |
| 2013/0244080 A1 | 9/2013 | Song et al. |

(Continued)

FOREIGN PATENT DOCUMENTS

| | | |
|---|---|---|
| CN | 110770941 A | 2/2020 |
| JP | 7-173447 A | 7/1995 |

(Continued)

OTHER PUBLICATIONS

International Search Report (PCT/ISA/210) issued in PCT/KR2021/011628 mailed on Dec. 27, 2021.

*Primary Examiner* — Brian R Ohara
(74) *Attorney, Agent, or Firm* — Birch, Stewart, Kolasch & Birch, LLP

(57) ABSTRACT

A separator for an electrochemical device, including a porous polymer substrate and an inorganic coating layer on at least one surface of the porous polymer substrate. The inorganic coating layer includes inorganic particles and a binder resin. The binder resin includes a PVAc-containing first binder resin and a PVDF-containing second binder resin.

12 Claims, 1 Drawing Sheet

(56) References Cited

U.S. PATENT DOCUMENTS

| | | |
|---|---|---|
| 2014/0038025 A1 | 2/2014 | Ha et al. |
| 2018/0034025 A1 | 2/2018 | Lee et al. |
| 2020/0056064 A1 | 2/2020 | Bossolo et al. |
| 2020/0350546 A1 | 11/2020 | Sung et al. |
| 2020/0411827 A1* | 12/2020 | Kuratani ............. H01M 50/451 |
| 2021/0280944 A1 | 9/2021 | Jang et al. |

FOREIGN PATENT DOCUMENTS

| | | |
|---|---|---|
| JP | 6334071 B1 | 5/2018 |
| JP | 2019-535849 A | 12/2019 |
| JP | 2020-123453 A | 8/2020 |
| KR | 10-2011-0095372 A | 8/2011 |
| KR | 10-2013-0105334 A | 9/2013 |
| KR | 10-2014-0017762 A | 2/2014 |
| KR | 10-2016-0129762 A | 11/2016 |
| KR | 10-2020-0049649 A | 5/2020 |
| KR | 10-2020-0051370 A | 5/2020 |
| KR | 10-2020-0093546 A | 8/2020 |

* cited by examiner

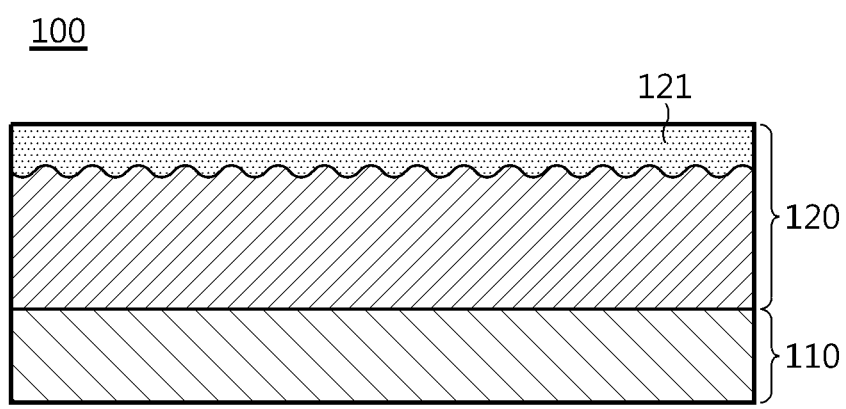

SEPARATOR FOR ELECTROCHEMICAL DEVICE AND ELECTROCHEMICAL DEVICE INCLUDING THE SAME

TECHNICAL FIELD

The present application claims priority to Korean Patent Application No. 10-2020-0109686 filed on Aug. 28, 2020 in the Republic of Korea. The present disclosure relates to a separator for an electrochemical device and an electrochemical device including the same.

BACKGROUND ART

Recently, lithium-ion secondary batteries have been used widely as power sources of portable electronic instruments, such as notebook PCs, cellular phones, digital cameras, camcorders, or the like. In addition, since such lithium-ion secondary batteries have high energy density, they have been applied to transport means, such as electric vehicles.

As portable electronic instruments have been downsized and weight-lightened, casings of nonaqueous secondary batteries have been simplified. Originally, battery cans made of stainless steel were used as casings. However, after casings made of aluminum cans have been developed, soft pack casings made of aluminum laminate packs have been developed recently. In the case of a soft pack casing made of aluminum laminate, it is flexible, and thus may form a gap between an electrode and a separator during charge/discharge, resulting in the technical problem of degradation of cycle life. To solve the problem, technologies of adhesion between an electrode and a separator are important, and many technical attempts have been made.

In addition, shape deformation is applied, and for example, an electrode assembly including a separator bound to electrodes is bent, in order to obtain a curved battery. Herein, when the adhesion between the electrode and the separator is low, the separator and the electrode may be detached from each other during the deformation. Due to this, no electrochemical reaction may occur between the electrode and the separator, or a dead space having low efficiency may be generated, resulting in the problem of degradation of battery performance.

In general, a separator for an electrochemical device has a structure including a porous polymer film (separator substrate) and an inorganic coating layer formed on at least one surface of the separator substrate. The inorganic coating layer includes inorganic particles and a binder resin, and is introduced to provide the separator substrate with durability (for preventing film from breakage) or heat resistance/stability (for preventing heat shrinking). As a binder resin for such a separator, a polyvinylidene fluoride (PVDF)-based resin has been used frequently, and the binder resin is migrated toward the separator surface through a humidified phase separation process to form an adhesive top layer portion having a high content of binder resin in the vicinity of the surface of the inorganic coating layer. However, since the adhesion of a PVDF-based resin itself is low, it is difficult to ensure a high level of binding force. To improve the adhesion, the content or coating amount of the binder resin may be increased. However, in this case, the adhesive layer becomes thick to cause a decrease in energy density and an increase in resistance undesirably. It is required for the adhesive layer of a separator to accomplish both high adhesion and high ion conductivity even with a small thickness. In addition, the separator should be a chemically and electrochemically stable material so that a battery may be used stably for a long time, and the process for manufacturing a separator should have high productivity to allow mass production at low costs. Under these circumstances, there is a need for developing a separator for a secondary battery satisfying the above-mentioned requirements.

DISCLOSURE

Technical Problem

The present disclosure is designed to solve the problems of the related art, and therefore the present disclosure is directed to providing a separator including an inorganic coating layer which provides improved adhesion between the separator and an electrode. The present disclosure is also directed to providing a method for manufacturing the separator. It will be easily understood that the objects and advantages of the present disclosure may be realized by the means shown in the appended claims and combinations thereof.

Technical Solution

According to the first embodiment of the present disclosure, there is provided a separator for an electrochemical device, including a porous polymer substrate and an inorganic coating layer on at least one surface of the porous polymer substrate, wherein the inorganic coating layer includes inorganic particles and a binder resin composition, the binder resin composition includes a first binder resin and a second binder resin, the first binder resin includes polyvinyl acetate (PVAc) and/or a PVAc-containing copolymer, the second binder resin includes a polyvinylidene fluoride (PVDF)-containing polymer, at least one hydrogen atom in the main chain of the PVDF-containing polymer is substituted with a —C(=O)O— group-containing functional group, and the second binder resin is present at a ratio of 5 wt % to 35 wt % based on 100 wt % of the combined weight of the first binder resin and the second binder resin.

According to the second embodiment of the present disclosure, there is provided the separator for an electrochemical device as defined in the first embodiment, wherein the first binder resin includes the PVAc-based copolymer, which includes at least one compound represented by the following Chemical Formula 1:

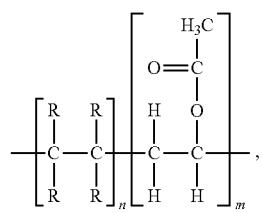

[Chemical Formula 1]

wherein each R independently represents —H, —OR$_4$, —C(=O)—R$_4$, —C(=O)O—R$_4$, —OC(=O)—R$_4$ or —C(=O)NH—R$_4$, and each R$_4$ independently represents H, or a substituted or non-substituted C1-C5 alkyl.

According to the third embodiment of the present disclosure, there is provided the separator for an electrochemical device as defined in the first or the second embodiment, wherein the PVDF-containing polymer includes at least one compound represented by the following Chemical Formula 2:

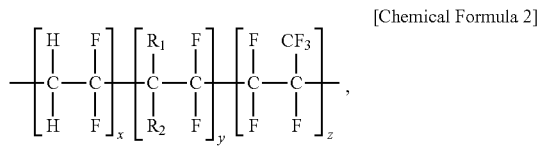

[Chemical Formula 2]

wherein each of $R_1$ and $R_2$ independently represents —H or —C(=O)O—$R_5$, $R_5$ represents at least one selected from —H, —$(CH_2)_{n1}CH_3$ and —$(CH_2)_{n2}OH$, and each of n1 and n2 independently represents 0 or an integer of 1 to 5.

According to the fourth embodiment of the present disclosure, there is provided the separator for an electrochemical device as defined in any one of the first to the third embodiments, wherein the PVDF-containing polymer includes a repeating unit substituted with a —C(=O)O— group, and the repeating unit substituted with a —C(=O)O— group is present at a ratio of 0.5 wt % to 5 wt % based on 100 wt % of the PVDF-containing polymer.

According to the fifth embodiment of the present disclosure, there is provided the separator for an electrochemical device as defined in any one of the first to the fourth embodiments, wherein the first binder resin has a weight average molecular weight (Mw) of 100,000 to 600,000.

According to the sixth embodiment of the present disclosure, there is provided the separator for an electrochemical device as defined in any one of the first to the fifth embodiments, wherein the second binder resin has a weight average molecular weight (Mw) of 100,000 to 2,000,000.

According to the seventh embodiment of the present disclosure, there is provided the separator for an electrochemical device as defined in any one of the first to the fifth embodiments, wherein the inorganic coating layer includes the inorganic particles in an amount of 50 wt % or more based on 100 wt % of the total weight of the binder resin and the inorganic particles.

According to the eighth embodiment of the present disclosure, there is provided the separator for an electrochemical device as defined in any one of the first to the seventh embodiments, wherein the inorganic coating layer includes an electrode adhesive portion present on a surface of the inorganic coating layer and a bottom portion, and wherein a concentration of the binder resin present in the electrode adhesive portion is higher than a concentration of binder resin in the bottom portion.

According to the ninth embodiment of the present disclosure, there is provided the separator for an electrochemical device as defined in any one of the first to the eighth embodiments, wherein the inorganic particles in the inorganic coating layer are bound by the binder resin, the inorganic coating layer has a plurality of micropores formed by interstitial volumes between the inorganic particles, the inorganic coating layer includes an electrode adhesive portion present on a surface of the inorganic coating layer and a bottom portion, and wherein a concentration of the binder resin present in the electrode adhesive portion is higher than a concentration of binder resin in the bottom portion, and the inorganic coating layer and the electrode adhesive portion are bound integrally and inseparably to each other.

According to the tenth embodiment of the present disclosure, there is provided the separator for an electrochemical device as defined in the ninth embodiment, wherein the electrode adhesive portion is formed by phase separation process of the binder resin, when the separator is dried under a humidified condition.

According to the eleventh embodiment of the present disclosure, there is provide a method for manufacturing a separator, including the steps of:
(S1) preparing a slurry for forming an inorganic coating layer containing inorganic particles, a first binder resin, a second binder resin and a solvent;
(S2) applying the slurry to at least one surface of the porous polymer substrate; and
(S3) drying the slurry coated on the porous polymer substrate to form the inorganic coating layer,
wherein the drying is carried out under a relative humidity of about 30-70%, and the solvent includes acetone.

According to the twelfth embodiment of the present disclosure, there is provided an electrochemical device, including a negative electrode, a positive electrode and a separator interposed between the negative electrode and the positive electrode, wherein the separator is the separator according to the present disclosure.

Advantageous Effects

The separator and the electrochemical device including the same according to the present disclosure includes an inorganic coating layer which uses a PVAc-based binder resin and a PVDF-based binder resin having a —C(=O))— group introduced thereto.

Therefore, it is possible to provide excellent adhesion between the separator and an electrode, and to prevent separation of the inorganic particles from the inorganic coating layer. In addition, since the binder resin in the separator is not dissolved well in an electrolyte, it is possible to prevent an increase in viscosity of the electrolyte and an increase in resistance.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

The FIGURE is a schematic view illustrating the sectional structure of the separator according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'about', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

Unless otherwise stated, content ratios stated herein refer to weight ratios.

The present disclosure relates to a separator for an electrochemical device and an electrochemical device including the same. As used herein, the term 'electrochemical device' means a device converting chemical energy into electrical energy by electrochemical reactions and has a concept covering a primary battery and a secondary battery, wherein the secondary battery is rechargeable and has a concept covering a lithium-ion battery, nickel-cadmium battery, nickel-hydrogen battery, or the like.

1. Separator

1) Structure of Separator

The separator 100 according to the present disclosure includes a porous polymer substrate 110 and an inorganic coating layer 120 formed on at least one surface of the porous polymer substrate. The inorganic coating layer includes inorganic particles and a binder resin composition.

According to the present disclosure, the binder resin composition includes a first binder resin and a second binder resin, wherein the first binder resin includes polyvinyl acetate (PVAc) and/or a PVAc-based copolymer, the second binder resin includes a polyvinylidene fluoride (PVDF)-based polymer, and at least one hydrogen atom in the main chain of the PVDF-based polymer is substituted with a —C(=O)O— group-containing functional group. Meanwhile, according to an embodiment of the present disclosure, the second binder resin is present at a ratio of 5-35 wt % based on 100 wt % of the combined weight of the first and the second binder resins.

In addition, according to an embodiment of the present disclosure, the inorganic coating layer has a top layer portion having a high content of binder resin, and thus shows high adhesion between the separator and an electrode.

According to an embodiment of the present disclosure, the separator may have a thickness of 5-30 µm and the thickness may be controlled suitably within the above-defined range. For example, the thickness may be 15-25 µm.

In addition, the separator may have a permeability of about 50 sec/100 cc to 3000 sec/100 cc.

As used herein, the term 'permeability' means a time required for 100 cc of air to pass through an object, such as a separator or porous polymer substrate, to be tested for permeability, is expressed in the unit of second/100 cc, may be used exchangeably with 'transmission', and is generally represented by Gurley value, or the like. According to an embodiment of the present disclosure, the permeability may be determined according to JIS P8117. In addition, air permeability P1 determined for an object having a thickness of T1 may be converted into air permeability P2 of the object having a thickness of 20 µm according to the mathematical formula of $P2=(P1\times20)/T1$.

Meanwhile, according to the present disclosure, the porosity and pore size may be determined by BELSORP (BET apparatus) available from BEL JAPAN Co. using an adsorption gas, such as nitrogen, or through a method, such as mercury intrusion porosimetry or capillary flow porosimetry. According to an embodiment of the present disclosure, the thickness and weight of the resultant coating layer may be measured to calculate porosity from the theoretical density of the coating layer.

2) Porous Polymer Substrate

The porous polymer substrate means a porous ion-conducting barrier which allows ions to pass therethrough while interrupting an electrical contact between a negative electrode and a positive electrode, and has a plurality of pores formed therein. The pores are interconnected so that gases or liquids may pass from one surface of the substrate to the other surface of the substrate.

Materials forming the porous polymer substrate may be any organic materials or inorganic materials having electrical insulation property. Particularly, with a view to imparting a shut-down function to a substrate, it is preferred to use a thermoplastic resin as a material forming the substrate. Herein, the term 'shut-down function' means a function of preventing thermal runaway of a battery by allowing a thermoplastic resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred.

In addition to polyolefin, the thermoplastic resin may further include at least one polymer resin selected from polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene. The porous polymer substrate may include a non-woven web, a porous polymer film, or a laminate of two or more layers thereof, but is not limited thereto.

Particularly, the porous polymer substrate is any one of the following a) to e):

a) A porous film formed by melting/extruding a polymer resin;

b) A multilayer film formed by stacking two or more layers of the porous films of a);

c) A non-woven web formed by integrating filaments obtained by melting/spinning a polymer resin;

d) A multilayer film formed by stacking two or more layers of the non-woven webs of c); and e) A porous composite film having a multilayer structure including two or more of a) to d).

According to the present disclosure, the porous polymer substrate preferably has a thickness of 3-12 µm, or 5-12 µm.

When the thickness is smaller than the above-defined range, it is not possible to obtain a sufficient conducting barrier function. On the other hand, when the thickness is excessively larger than the above-defined range (i.e. the porous polymer substrate is excessively thick), the separator may show excessively increased resistance.

According to an embodiment of the present disclosure, the polyolefin preferably has a weight average molecular weight of 100,000-5,000,000. When the weight average molecular weight is smaller than 100,000, it is difficult to ensure sufficient dynamic physical properties. In addition, when the weight average molecular weight is larger than 5,000,000, shut-down characteristics may be degraded or molding may become difficult.

As used herein, the term 'molecular weight' refers to weight average molecular weight ($M_w$). For example, the molecular weight may be determined by using gel permeation chromatography (GPC) (PL GPC220, Agilent Technologies).

In addition, the porous polymer substrate may have a puncture strength of 300 gf or more in terms of improvement of production yield. The puncture strength of a porous substrate refers to the highest puncture load (go measured by carrying out a puncture test with Kato tech KES-G5 handy compression tester under the conditions of a needle tip radius of curvature of 0.5 mm and a puncture rate of 2 mm/sec.

According to an embodiment of the present disclosure, the porous polymer substrate may be any porous polymer substrate, as long as it is a planar porous polymer substrate used for an electrochemical device. For example, an insulating thin film showing high ion permeability and mechanical strength and generally having a pore diameter of 10-100 nm and a thickness of 5-12 μm may be used.

3) Inorganic Coating Layer

According to the present disclosure, the separator includes an inorganic coating layer formed on at least one surface of the porous polymer substrate. The inorganic coating layer includes a mixture containing a binder resin and inorganic particles. The mixture may be present in an amount of 90 wt % or more, 95 wt % or more, or 99 wt % or more, based on 100 wt % of the inorganic coating layer. In the inorganic coating layer, the inorganic particles are attached to one another by the binder (i.e. the binder resin connects the inorganic particles among themselves and fixes them) so that the inorganic particles may retain their binding states. According to an embodiment of the present disclosure, the inorganic particles are closely packed in the inorganic coating layer, and the inorganic coating layer may have a plurality of micropores derived from the interstitial volumes formed among the inorganic particles. The micropores are interconnected to provide a porous structure which allows gases or liquids to pass from one surface to the other surface. According to an embodiment of the present disclosure, the inorganic particles are totally or partially surface-coated with the binder resin and are bound to one another in a face-to-face or dot-to-dot manner by means of the binder resin. According to an embodiment of the present disclosure, the inorganic particles may be present in an amount of 50 wt % or more, preferably 60 wt % or more, 70 wt % or more, or 80 wt % or more, based on 100 wt % of the combined weight of the binder resin and the inorganic particles. Within the above-defined range, the inorganic particles may also be present in an amount of 95 wt % or less, or 90 wt % or less, based on 100 wt % of the combined weight of the binder resin and the inorganic particles.

The inorganic coating layer preferably has a thickness of 1-5 μm on one surface of the porous substrate. Preferably, the thickness may be 3 μm or more. Within the above-defined range, it is possible to provide excellent adhesion to an electrode, thereby providing increased cell strength of the battery. Meanwhile, an inorganic coating layer thickness of 4 μm or less is advisable in terms of cycle characteristics and resistance characteristics of the battery.

Meanwhile, according to the present disclosure, the inorganic coating layer is provided with an electrode adhesive portion 121 having a high content of binder resin at the top layer portion thereof by virtue of the characteristics of the method for manufacturing a separator described hereinafter. The FIGURE is a schematic view illustrating the sectional structure of the separator 100 according to an embodiment of the present disclosure. Referring to FIG. 1 the FIGURE, the separator according to the present disclosure includes an inorganic coating layer 120 formed on the surface of a porous polymer substrate 110, wherein the binder resin is distributed at a higher concentration at the top layer portion of the inorganic coating layer as compared to the other portions. According to an embodiment of the present disclosure, the expression 'the binder resin is distributed at a higher concentration' means that the binder resin is present in an amount of 50 wt % or more, 70 wt % or more, or 80 wt % or more in the corresponding portion. For the convenience of description, the top layer portion in which the binder resin is distributed at a higher concentration will be referred to as 'electrode adhesive portion 121' hereinafter. According to an embodiment of the present disclosure, the electrode adhesive portion results from the migration of the binder resin toward the top layer portion through a process, such as humidified phase separation. Therefore, the electrode adhesive portion is not a structure separated physically from the inorganic coating layer but is bound integrally and inseparably to the surface of the inorganic coating layer as a part of the inorganic coating layer. In addition, the thickness of the electrode adhesive portion may not be uniform.

4) Materials for Inorganic Coating Layer

A. Binder Resin Composition

According to an embodiment of the present disclosure, the binder resin composition includes a first binder resin and a second binder resin.

The first binder resin includes polyvinyl acetate (PVAc) and/or a PVAc-based copolymer, and the PVAc-based copolymer may be represented by the following Chemical Formula 1:

[Chemical Formula 1]

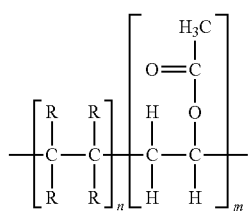

wherein each R may independently represent —H, —OR$_4$, —C(=O)—R$_4$, —C(=O)O—R$_4$, —OC(=O)—R$_4$ or —C(=O)NH—R$_4$. In addition, each R$_4$ may independently represent H, or a substituted or non-substituted C1-C5 alkyl. According to an embodiment of the present disclosure, the PVAc-based copolymer may include at least one selected from poly(vinyl acetate-co-methylacrylate) and poly(ethylene-co-vinyl acetate).

According to an embodiment of the present disclosure, the first binder resin preferably has a crystallinity of 50% or less, or is non-crystalline. In addition, the first binder resin preferably has a glass transition temperature (Tg) of 10-60° C. When the first binder resin satisfies the above-defined ranges, it is possible to improve the adhesion between the separator and an electrode. For example, it is possible to ensure an electrode-separator adhesion of 300 gf/25 mm (60° C., 6.5 MPa) or more. According to an embodiment of the present disclosure, the electrode-separator adhesion may refer to the adhesion of a product obtained by laminating a separator with an electrode under the processing condition of 60° C. and 6.5 MPa.

According to an embodiment of the present disclosure, the crystallinity means the ratio of crystals contained in a polymer. The crystallinity may be determined by the wide angle X-ray scattering method (WAXS), density analysis method and thermal analysis method.

For example, the thermal analysis method may be carried out by using a differential scanning calorimeter (DSC). Herein, the crystallinity $X_c$ is calculated by the following formula:

$$X_c(\%)=(\Delta H_m \div \Delta H_m^0) \times 100$$

wherein $\Delta H_m$ represents the heat of melting of a sample measured by a DSC instrument, and $H_m^0$ represents equilibrium heat of melting. Herein, $H_m^0$ may be a value used in a known document. For examples, according to *Polymer Handbook*, iPP has an equilibrium heat of melting $H_m^0=8.7$ (kJ/mol).

Meanwhile, according to an embodiment of the present disclosure, the first binder resin may have a weight average molecular weight (Mw) of 100,000-600,000 g/mol. When the above-defined range is satisfied, an adhesive portion is formed on the separator surface through humidified phase separation, which is advantageous to ensuring adhesion to an electrode. The second binder resin includes a polyvinylidene fluoride (PVDF)-based polymer. In the PVDF-based polymer, at least one hydrogen atom in its main chain is substituted with a —C(=O)O— group-containing functional group. The second binder resin shows higher adhesion, as compared to the other PVDF-based binder resins to which no functional group is introduced, and thus can improve adhesion in a wet state after the injection of an electrolyte, i.e. after the separator is impregnated with an electrolyte. In addition, the second binder resin provides an effect of reducing the solubility of the first binder resin in an electrolyte.

According to the present disclosure, the second binder resin may include at least one compound represented by any one of the following Chemical Formula 2 to Chemical Formula 5:

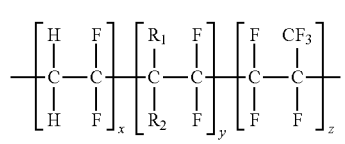
[Chemical Formula 2]

wherein each of $R_1$ and $R_2$ independently represents —H or —C(=O)O—$R_5$, $R_5$ represents at least one selected from —H, —(CH$_2$)$_{n1}$CH$_3$ and —(CH$_2$)$_{n2}$OH, and each of n1 and n2 independently represents 0 or an integer of 1-5. According to an embodiment of the present disclosure, $R_2$ may represent —C(=O)O(CH$_2$)$_2$OH.

Chemical Formula 2 includes a hexafluoroethylene (HFP) repeating unit.

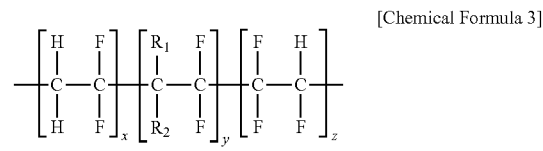
[Chemical Formula 3]

wherein each of $R_1$ and $R_2$ independently represents —H or —C(=O)O—$R_5$, $R_5$ represents at least one selected from H, —(CH$_2$)$_{n1}$CH$_3$ and —(CH$_2$)$_{n2}$OH, and each of n1 and n2 independently represents 0 or an integer of 1-5. Chemical Formula 3 includes a trifluoroethylene (TrFE) repeating unit.

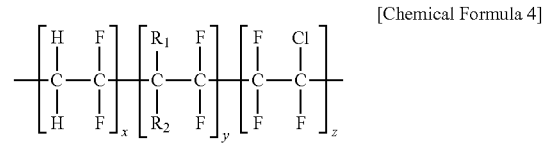
[Chemical Formula 4]

wherein each of $R_1$ and $R_2$ independently represents —H or —C(=O)O—$R_5$, $R_5$ represents at least one selected from H, —(CH$_2$)$_{n1}$CH$_3$ and —(CH$_2$)$_{n2}$OH, and each of n1 and n2 independently represents 0 or an integer of 1-5. Chemical Formula 4 includes a chlorotrifluoroethylene (CTFE) repeating unit.

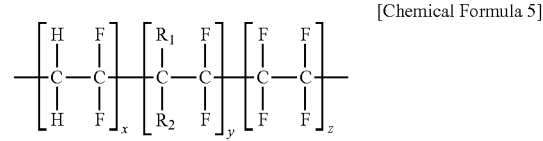
[Chemical Formula 5]

Wherein each of $R_1$ and $R_2$ independently represents —H or —C(=O)O—$R_5$, $R_5$ represents at least one selected from H, —(CH$_2$)$_{n1}$CH$_3$ and —(CH$_2$)$_{n2}$OH, and each of n1 and n2 independently represents 0 or an integer of 1-5. Chemical Formula 5 includes a tetrafluoroethylene (TFE) repeating unit.

Meanwhile, in Chemical Formula 2 to Chemical Formula 5, each of x, y and z may independently represent an integer of 1 or more.

According to an embodiment of the present disclosure, the second binder resin includes at least one compound represented by Chemical Formula 2.

As can be seen from Chemical Formula 2 to Chemical Formula 5, the PVDF-based polymer includes a repeating unit substituted with a —C(=O)O— group, and the repeating unit substituted with a —C(=O)O— group is introduced at a ratio of 0.5-5 wt % based on 100 wt % of the PVDF-based polymer. When the content of the repeating unit satisfies the above-defined range, the solubility of the first binder in an electrolyte may be reduced. Meanwhile, when the repeating unit is present at a ratio of larger than 5 wt %, the physical properties (particle size and sedimentation rate) of slurry may be degraded undesirably.

Meanwhile, according to an embodiment of the present disclosure, the second binder resin may have a weight average molecular weight (Mw, g/mol) of 100,000-2,000,000. For example, the second binder resin may have a molecular weight (Mw) of 500,000-1,500,000. When the second binder resin has an excessively large molecular weight (Mw), formation of an adhesive portion on the surface of the inorganic coating layer is delayed as described hereinafter, thereby making it difficult to realize adhesion. When the second binder resin has an excessively small molecular weight, an adhesive portion may be formed rapidly, but the content of the binder resin in the inorganic coating layer is low to cause degradation of the binding force among the inorganic particles or the peel strength between the inorganic particles and the separator substrate.

According to the present disclosure, the term 'molecular weight' refers to weight average molecular weight (Mw), and may be expressed in the unit of g/mol. In addition, the molecular weight (Mw) may be determined by using gel permeation chromatography (GPC, PL GPC220, Agilent Technologies). Herein, PL mixed B column available from Agilent Co. may be used, and tetrahydrofuran (THF) may be used as a solvent. For example, the weight average molecular weight (Mw) may be determined by using gel permeation chromatography (PL GPC220, Agilent technologies) under the following conditions: [column: PL MiniMixed B×2, solvent: THF, flow rate: 0.3 mL/min, sample concentration: 2.0 mg/mL, injection amount: 10 μL, column temperature: 40° C., detector: Agilent RI detector, standard: polystyrene (corrected with tertiary function), and data processing: ChemStation].

According to an embodiment of the present disclosure, the substitution ratio of each repeating unit, introduction of the functional group or the substitution ratio of such a repeating unit as HFP, CTFE, TrFE or TFE, in the second binder resin, may be determined based on the integral value of the specific peaks of the monomers identified in the $^1$H NMR (nuclear magnetic resonance) spectrum. Reference will be made to [Journal of Materials Chemistry, 2012, 22, 341] or AMT-3412-Ok about the substitution ratio analysis. For example, determination of the NMR spectrum may use a suitable system, such as Bruker Avance III HD 700 MHz or Varian 500 MHz NMR.

According to an embodiment of the present disclosure, if necessary, the inorganic coating layer may further include a third binder resin as a binder polymer, besides the first and the second binder resins. Particular examples of the third binder resin include, but are not limited to: polymethyl methacrylate, polybutyl acrylate, polybutyl methacrylate, polyacrylonitrile, polyvinyl pyrrolidone, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, or the like. The content of the third binder resin may be controlled suitably, considering the adhesion. For example, the content of the third binder resin may be 10 wt % or less based on 100 wt % of the binder resin composition.

In addition, according to an embodiment of the present disclosure, the inorganic coating layer may further include an additive, such as a dispersing agent and/or a thickening agent, in an amount of 1-3 wt % based on 100 wt % of the inorganic coating layer. According to an embodiment of the present disclosure, the additive may be at least one selected suitably from polyvinyl pyrrolidone (PVP), polyvinyl alcohol (PVA), hydroxyethyl cellulose (HEC), hydroxypropyl cellulose (HPC), ethylhydroxyethyl cellulose (EHEC), methyl cellulose (MC), carboxymethyl cellulose (CMC), hydroxyalkylmethyl cellulose and cyanoethyl polyvinyl alcohol.

B. Inorganic Particles

According to a particular embodiment of the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5 V based on Li/Li$^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be high-dielectric constant inorganic particles having a dielectric constant of 5 or more, preferably 10 or more. Non-limiting examples of the inorganic particles having a dielectric constant of 5 or more may include $BaTiO_3$, $Pb(Zr,Ti)O_3$ (PZT), $Pb_{1-x}La_xZr_{1-y}Ti_yO_3$(PLZT, wherein $0<x<1$, $0<y<1$), $Pb(Mg_{1/3}Nb_{2/3})O_3PbTiO_3$(PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or a mixture thereof.

In addition, as inorganic particles, it is possible to use inorganic particles having lithium-ion transportability, i.e. inorganic particles which contain lithium elements and do not store lithium but transport lithium ions. Non-limiting examples of the inorganic particles having lithium-ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4-Li_2S-SiS_2$, and $P_2S_5$-based glass ($Li_xP_yS_z$, $0<x<3$, $0<y<3$, $0<z<7$), such as $LiI-Li_2S-P_2S_5$, or a mixture thereof.

In addition, there is no particular limitation in the average particle diameter of the inorganic particles. However, the inorganic particles preferably have an average particle diameter of 0.1-1.5 μm with a view to formation of a coating layer with a uniform thickness and suitable porosity. When the average particle diameter is smaller than 0.1 μm, dispersibility may be degraded. When the average particle diameter is larger than 1.5 μm, the resultant coating layer may have an increased thickness.

2. Method for Forming Inorganic Coating Layer

The method for manufacturing a separator according to an embodiment of the present disclosure includes: preparing slurry for an inorganic coating layer including inorganic particles, a binder resin composition and a solvent; and applying the slurry to at least one surface of a separator substrate, followed by drying. In addition, the drying step may be carried out under a humidified condition. In a variant, the drying step may be carried out by dipping the porous substrate coated with the slurry in a non-solvent, and for example, by solidifying the binder resin and allowing the binder resin to be migrated toward the separator surface under a humidified condition.

First, the binder resin is dissolved in a solvent to prepare a polymer binder solution. Next, the polymer binder solution is introduced to and mixed with a mixture containing the inorganic particles and solvent to prepare slurry for forming an inorganic coating layer. The inorganic particles may be added, after they are pulverized to a predetermined average particle diameter in advance. In a variant, the inorganic particles may be introduced, and then dispersed while they are controlled and pulverized to a predetermined average particle diameter through a ball milling process, or the like. If necessary, supplementary agents, such as a dispersing agent, may be further introduced to the mixture and/or slurry.

Then, the slurry is applied onto a porous polymer substrate and is allowed to stand under a humidified condition for a predetermined time to solidify (dry) the binder resin.

While the binder resin is solidified under such a humidified condition, phase separation of the binder resin occurs in the slurry. According to an embodiment of the present disclosure, the humidified condition may include a relative humidity of about 30-70%. During the phase separation, the solvent migrates toward the surface portion of the inorganic coating layer and the binder resin migrates toward the surface portion of the inorganic coating layer along with the migration of the solvent, thereby forming an electrode adhesive portion having a high content of binder resin at the top layer portion. As a result, according to the present disclosure, an electrode adhesive portion having a high content of binder is formed effectively at the top layer portion by the second binder resin, and an adequate amount of the first binder resin and the second binder resin is present in the binder resin distributed in the electrode adhesive portion so that high adhesion may be realized between an electrode and the separator.

The solvent may be an ingredient capable of dissolving the binder resin. Preferably, a ketone solvent may be used. According to an embodiment of the present disclosure, the solvent may be selected suitably from acetone, methyl ethyl ketone, N-methyl pyrrolidone, and polar amide solvents such as dimethyl acetamide, dimethyl formamide and diethyl formamide, but is not limited thereto.

The slurry may be applied through a conventional coating process, such as Mayer bar coating, die coating, reverse roll coating or gravure coating. When the inorganic coating layer is formed on both surfaces of the porous substrate, the coating solution may be applied to each surface and then humidified phase separation and drying may be carried out. However, it is preferred to apply the coating solution to both surfaces of the porous substrate at the same time, followed by humidified phase separation and drying, in terms of productivity.

3. Electrode Assembly Including Separator

Meanwhile, the present disclosure provides a secondary battery including the separator. The battery includes a negative electrode, a positive electrode and a separator interposed between the negative electrode and the positive electrode, wherein the separator is the separator having the above-described characteristics.

According to the present disclosure, the positive electrode includes a positive electrode current collector and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_xMn_yNi_zCo_{(1-y-z)}O_2$ (wherein x is 0.5-2 and x+y+z=1), chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $Li_aNi_xCo_yMn_zO_2$ (0<a<1.5, 0<[x, y, z]<1, x+y+z=1), chemical formula of $LiMn_{2-x}M_xO_2$ (wherein M is Co, Ni, Fe, Cr, Zn or Ta, and x is 0.01-0.1) or $Li_2Mn_3M_xO_8$ (wherein M is Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, elements of Group 1, 2 or 3 in the Periodic Table, halogen; 0≤x≤1; 1≤y≤3; 1≤z≤8); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P, acetylene black, Ketjen black, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, and carboxymethyl cellulose.

The electrode assembly prepared as described above may be introduced to a suitable casing, and an electrolyte may be injected thereto to obtain a battery.

According to the present disclosure, the electrolyte is a salt having a structure of A+B−, wherein A+ includes an alkali metal cation such as Li+, Na+, K+ or a combination thereof, and B− includes an anion such as $PF_6^-$, $BF_4^-$, Cl−, Br−, I−, $ClO_4^-$, $AsF_6^-$, $cH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

Meanwhile, according to an embodiment of the present disclosure, the organic solvent includes an ester compound. Preferably, the ester compound may be used in an amount of 30 wt % or more, 50 wt % or more, 60 wt % or more, or 65 wt % or more, based on 100 wt % of the organic solvent.

According to an embodiment of the present disclosure, the ester compound includes at least one selected from the group consisting of isobutyl propionate, isoamyl propionate, isobutyl butyrate, isopropyl propionate, methyl propionate, ethyl propionate, propyl propionate, butyl propionate, methyl acetate, ethyl acetate, propyl acetate, butyl acetate, methyl butyrate, ethyl butyrate, propyl butyrate and butyl butyrate.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Examples (1) Manufacture of Separator

First, $Al_2O_3$ and a binder resin composition were introduced to acetone to obtain slurry for forming an inorganic coating layer. The mixing ratio of the inorganic particles to the binder resin in the slurry was 80:20 on the weight basis. In addition, each slurry had a solid content of about 18 wt %, except acetone. The slurry was applied to a separator (polyethylene, porosity 45%, thickness 9 μm) at a loading amount of 15 g/m² based on the area of the separator and dried under a humidified condition of a relative humidity of 45%. Then, the dried product was cut into a size of 60 mm (length)×25 mm (width) to obtain a separator. The composition of the binder resin composition used for each of Examples and Comparative Examples is shown in the following Table 1.

TABLE 1

| | | | Ex. 1 | Ex. 2 | Ex.3 | Ex.4 | Comp. Ex. 1 | Comp. Ex. 2 | Comp. Ex. 3 | Comp. Ex. 4 |
|---|---|---|---|---|---|---|---|---|---|---|
| First binder resin | PVAc | Mw (g/mol) | 150,000 | — | — | — | 800,000 | — | 800,000 | — |
| | | Tg (° C.) | 41 | — | — | — | 43 | — | 43 | — |
| | | Crystallinity (%) | 0 | — | — | — | 0 | — | 0 | — |
| | | Content (wt %) | 80 | 0 | 0 | 0 | 100 | 0 | 80 | 0 |
| | P(VAc-co-MA) | Mw (g/mol) | — | 300,000 | 300,000 | 300,000 | — | 300,000 | — | 300,000 |
| | | Tg (° C.) | — | 35 | 35 | 35 | — | 35 | — | 35 |
| | | Crystallinity (%) | — | 0 | 0 | 0 | — | 0 | — | 0 |
| | | Content (wt %) | 0 | 90 | 80 | 70 | 0 | 100 | 0 | 80 |
| Second binder resin | PVDF-HFP | Mw (g/mol) | — | — | — | — | — | — | 300,000 | 300,000 |
| | | HFP Substitution degree (wt %) | — | — | — | — | — | — | 5 | 5 |
| | | Content (wt %) | 0 | 0 | 0 | 0 | 0 | 0 | 20 | 20 |
| | PVDF-HFP (COO—) | Mw (g/mol) | 1,000,000 | 1,000,000 | 1,000,000 | 1,000,000 | — | — | — | — |
| | | HFP substitution degree (wt %) | 5 | 5 | 5 | 5 | — | — | — | — |
| | | Substitution degree with C(=O)O— repeating unit (wt %) | 1 | 1 | 1 | 1 | — | — | — | — |
| | | Content (wt %) | 20 | 10 | 20 | 30 | 0 | 0 | 0 | 0 |

Each content represents the weight percentage (wt %) of each ingredient based on 100 wt % of the binder resin composition.

P(VAc-co-MA): Poly(vinyl acetate-co-methylacrylate)

PVDF-HFP(COO—): Poly(vinylidene fluoride-co-hexafluoropropylene) substituted with hydroxyethyl acrylate ($R_2$ in Chemical Formula 2 represents —C(=O)O(CH2)$_2$OH)

(2) Test Examples

1) Evaluation of Binder Solubility

Each of the binder resin compositions as shown in Table 1 was dissolved in acetone to prepare a polymer solution. The solid content was 5 wt % except acetone. Each polymer solution was applied to a glass plate and dried under a humidified condition of a relative humidity of about 45% to obtain a binder film. Each binder film was introduced to a solvent (ethyl methyl carbonate, 70° C.) to a concentration of 5 wt %, and was allowed to stand therein for 2 hours. Then, the temperature of the solvent was cooled to room temperature, and the same temperature was maintained for 24 hours. After that, each binder film was taken out, and each solvent was recovered to determined the content of the binder film dissolved therein by using a solid content analyzer. The results are shown in the following Table 2.

2) Determination of Decrease in Weight

Three sheets of each separator specimen obtained according to Examples 1-4 and Comparative Examples 1-4 as described in the above part (1) were dipped in a solvent (ethyl methyl carbonate, 500 μL) and allowed to stand therein for 24 hours. Then, each separator specimen was taken out and weighed, and a decrease in weight was calculated by using the following Mathematical Formula 1. The results are shown in the following Table 2.

Decrease in weight (%)=[(Initial weight of separator specimen−Weight of separator specimen after taking-out)/Initial weight of separator specimen]×100     [Mathematical Formula 1]

3) Determination of Negative Electrode/Separator Adhesion

To determine the negative electrode/separator adhesion of each separator obtained according to Examples 1-4 and Comparative Examples 1-4 as described in the above part (1), the negative electrode and separator were adhered to each other at 60° C. under 6.5 MPa to obtain a half-cell. Then, an UTM instrument was used to apply force to the half-cell at 180° and a rate of 300 mm/min. Herein, the force required for separating the negative electrode and separator from each other was measured. The results are shown in the following Table 2.

TABLE 2

| | Binder solubility (w %) | Decrease in weight of coating layer (wt %) | Negative electrode/separator adhesion (gf/25 mm) Adhesion in dry state |
|---|---|---|---|
| Ex. 1 | 3 | 11 | 60 |
| Ex. 2 | 3.5 | 11 | 90 |
| Ex. 3 | 2.7 | 9 | 70 |
| Ex. 4 | 2.5 | 7 | 50 |
| Comp. Ex. 1 | 5 | 70 | — |
| Comp. Ex. 2 | 5 | 70 | 120 |
| Comp. Ex. 3 | 4 | 40 | — |
| Comp. Ex. 4 | 4 | 40 | 110 |

As can be seen from the above results, Examples 1-4 provide better results in terms of binder solubility, as compared to Comparative Examples 1-4. Therefore, since the separator according to the present disclosure shows low binder resin solubility in an electrolyte, when it is applied to a battery, it is less likely that the electrolyte undergoes an increase in viscosity or the electrochemical characteristics of the battery are degraded. In addition, in the case of the negative electrode/separator adhesion (dry adhesion) measured before being dipped in an electrolyte, it can be seen that a level of adhesion sufficient to retain the binding force between an electrode and the separator is realized during the manufacture of an electrode assembly. Meanwhile, each of Comparative Examples 1-4 shows higher binder solubility, and thus provides a high decrease in weight of the inorganic coating layer. When each of the separators according to Comparative Examples 1-4 is applied to a battery, the electrolyte may undergo an increase in viscosity due to the binder resin ingredient dissolved out from the inorganic coating layer. Meanwhile, Comparative Examples 1 and 3 cannot realize dry adhesion and provide poor processability during the manufacture of an electrode assembly. In addition, it can be seen that Comparative Examples 2 and 4 provide a sufficient degree of dry adhesion but show high binder solubility, and thus have lower quality as compared to the separator according to the present disclosure.

What is claimed is:

1. A separator for an electrochemical device, comprising:
   a porous polymer substrate; and
   an inorganic coating layer on at least one surface of the porous polymer substrate,
   wherein the inorganic coating layer comprises inorganic particles and a binder resin composition,
   wherein the binder resin composition comprises a first binder resin and a second binder resin,
   wherein the first binder resin comprises at least one of polyvinyl acetate (PVAc) or a PVAc-containing copolymer,
   wherein the second binder resin comprises a polyvinylidene fluoride (PVDF)-containing polymer, and at least one hydrogen atom in a main chain of the PVDF-containing polymer is substituted with a —C(=O)O— group-containing functional group, and
   wherein the second binder resin is present at a ratio of 5 wt % to 35 wt % based on 100 wt % of a combined weight of the first binder resin and the second binder resin.

2. The separator for the electrochemical device according to claim 1, wherein the first binder resin comprises the PVAc-based copolymer, which comprises at least one compound represented by the following Chemical Formula 1:

[Chemical Formula 1]

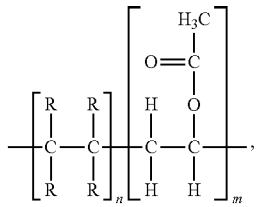

wherein each R independently represents —H, —OR$_4$, —C(=O)—R$_4$, —C(=O)O—R$_4$, —OC(=O)—R$_4$ or —C(=O)NH—R$_4$, and each R$_4$ independently represents H, or a substituted or non-substituted C1-C5 alkyl.

3. The separator for the electrochemical device according to claim 1, wherein the PVDF-containing polymer comprises at least one compound represented by the following Chemical Formula 2:

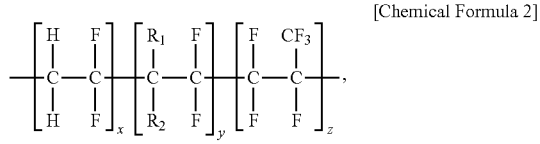

[Chemical Formula 2]

wherein each of $R_1$ and $R_2$ independently represents —H or —C(=O)O—$R_5$, $R_5$ represents at least one selected from —H, —$(CH_2)_{n1}CH_3$ and —$(CH_2)_{n2}OH$, and each of n1 and n2 independently represents 0 or an integer of 1 to 5.

4. The separator for the electrochemical device according to claim 1, wherein the PVDF-containing polymer comprises a repeating unit substituted with a —C(=O)O— group, and the repeating unit substituted with a —C(=O)O— group is present at a ratio of 0.5 wt % to 5 wt % based on 100 wt % of the PVDF-containing polymer.

5. The separator for the electrochemical device according to claim 1, wherein the first binder resin has a weight average molecular weight (Mw) of 100,000 to 600,000.

6. The separator for the electrochemical device according to claim 1, wherein the second binder resin has a weight average molecular weight (Mw) of 100,000 to 2,000,000.

7. The separator for the electrochemical device according to claim 1, wherein the inorganic coating layer comprises the inorganic particles in an amount of 50 wt % or more based on 100 wt % of a total weight of the binder resin and the inorganic particles.

8. The separator for the electrochemical device according to claim 1, wherein the inorganic coating layer comprises an electrode adhesive portion present on a surface of the inorganic coating layer and a bottom portion, and wherein a concentration of the binder resin present in the electrode adhesive portion is higher than a concentration of binder resin in the bottom portion.

9. The separator for the electrochemical device according to claim 1, wherein the inorganic particles in the inorganic coating layer are bound by the binder resin,
wherein the inorganic coating layer has a plurality of micropores formed by interstitial volumes between the inorganic particles,
wherein the inorganic coating layer comprises an electrode adhesive portion present on a surface of the inorganic coating layer and a bottom portion, and wherein a concentration of the binder resin present in the electrode adhesive portion is higher than a concentration of binder resin in the bottom portion, and
wherein the inorganic coating layer and the electrode adhesive portion are bound integrally and inseparably to each other.

10. The separator for the electrochemical device according to claim 9, wherein the electrode adhesive portion is formed by a phase separation process of the binder resin, when the separator is dried under a humidified condition.

11. A method for manufacturing the separator as defined in claim 1, the method comprising the steps of:
(S1) preparing a slurry for forming the inorganic coating layer comprising inorganic particles, the first binder resin, the second binder resin and a solvent;
(S2) applying the slurry to at least one surface of the porous polymer substrate; and
(S3) drying the slurry coated on the porous polymer substrate to form the inorganic coating layer,
wherein the drying is carried out under a relative humidity of about 30-70%, and
wherein the solvent comprises acetone.

12. An electrochemical device, comprising:
a negative electrode,
a positive electrode, and
a separator interposed between the negative electrode and the positive electrode,
wherein the separator is the same as defined in claim 1.

* * * * *